US005261564A

United States Patent [19]

Yelvington

[11] Patent Number: 5,261,564

[45] Date of Patent: Nov. 16, 1993

[54] DRUM-TYPE VENDING MACHINE

[75] Inventor: Richard D. Yelvington, Jacksonville, Fla.

[73] Assignee: Jax Vending, Inc., Jacksonville, Fla.

[21] Appl. No.: 797,452

[22] Filed: Nov. 22, 1991

[51] Int. Cl.[5] .............. B65G 59/00

[52] U.S. Cl. .............. 221/113; 221/122; 221/133

[58] Field of Search .............. 221/113, 114, 115, 119, 221/120, 121, 122, 133, 178, 179, 181, 241

[56] References Cited

U.S. PATENT DOCUMENTS

| | | | |
|---|---|---|---|
| 833,574 | 10/1906 | Bigelow | 221/113 X |
| 1,012,940 | 12/1911 | Vandiver | 221/133 X |
| 1,081,212 | 12/1913 | Collins | 221/122 |
| 1,121,804 | 12/1914 | Coulson | 221/122 X |
| 1,686,091 | 10/1928 | Manning | 221/241 X |
| 2,230,401 | 2/1941 | Gabrielsen | 221/115 X |
| 3,213,264 | 10/1965 | Pritz | 221/113 X |
| 3,242,931 | 3/1966 | Wandrey | 221/113 X |
| 3,351,232 | 11/1967 | Anderson | 221/113 |
| 3,426,941 | 2/1969 | Hovekamp | 221/241 X |

*Primary Examiner*—Robert P. Olszewski
*Assistant Examiner*—Dean A. Reichard
*Attorney, Agent, or Firm*—Deveau, Colton & Marquis

[57] ABSTRACT

A drum-type vending machine for vending articles, particularly snack-size candy, comprises a housing, a rotary drum mounted within the housing for rotation about a longitudinal axis of the drum, the drum including a plurality of vertical bins for holding articles, and a dispensing mechanism in the form of a coin slide and a candy dispensing chute, the coin slide being selectively operable with the bins for dispensing a bottom-most candy from a selected one of the bins. Each of the vertical bins comprises wire members for retaining articles in the stack, the position of the wire members being radially adjustable for maintaining the candy in a preferred orientation in the stack.

16 Claims, 4 Drawing Sheets

DRUM-TYPE VENDING MACHINE

TECHNICAL FIELD

The present invention generally relates to vending machines and more particularly relates to a drum-type vending machine for vending candy and other items.

BACKGROUND OF THE INVENTION

In recent years, so-called "snack-size" candy has been brought to market. This snack-size candy is smaller than the traditional full size candy bars and candy and presents something of a challenge with regard to vending the snack-size candy in vending machines. The snack-size candy typically is packaged in a plastic foil package approximately 1 inch wide by 3 inches long. These snack-size candies often have irregular shapes and sizes. The smallness of the packages and the irregularity of the sizes and shapes of the packages makes it difficult to vend these smaller candies reliably in the same vending machines used to vend larger, traditional candy. Also, it is generally inefficient to dispense small candies from machines designed to vend large candy.

It has been known in the past to vend one or a small number of very small candies in a screw-type machine. This is the traditional "gum ball" machine in which one would place a coin and a turn a handle to both deliver the coin to a coin box and to dispense one or a small number of candies from a large hopper. This type of device generally is poorly suited for dispensing snack-size candy because of limited capacity of this type of machine and because this type of machine tends to be bulky. Also, these screw-type machines do not present any selection capability, i.e., they require a separate coin mechanism for each type of candy to be dispensed.

In the vending of Packages of gum, it has long been known to provide a rotary or drum-type vending machine. Examples of these are found in U.S. Pat. No. 1,075,527 of Whitmore for "Vending Machine", U.S. Pat. No. 1,081,212 of Collins for "Vending Machine", and U.S. Pat. No. 1,121,804 of for "Gum Vending Machine". These type of vending machines generally have a number of trays (bins) which are disposed in carousel fashion about a rotating drum so that by rotating the drum a desired tray of gum can be brought into cooperation with a coin box. While these devices are generally suitable for use with gum packages, they are poorly suited for use with snack-size candy because the trays are generally of fixed dimension and fixed geometry. That is, the trays are designed to accept packages of a known shape and size. Irregular and odd shapes and sizes would tend to jam in these types of machines. Also, these types of trays provide limited visibility of the packaging of the individual snack-size candy and the machines typically have a limited capacity.

Accordingly, a need yet remains for a vending machine which is suitable for use with snack-size candy and which is compact, operates reliably without jamming, has a large capacity, and provides good visibility of the packaging of the candy in each tray. It is to the provision of such a vending machine that the present invention is primarily directed.

SUMMARY OF THE INVENTION

Briefly described, in a preferred form the present invention comprises a drum-type vending machine for vending articles, such as small candy, the vending machine comprising a housing and a rotary drum mounted within the housing for rotation about a longitudinal axis of the drum. The drum includes a number of vertical bins for holding articles in a stack. The vertical bins each comprise a plurality of elongate, generally narrow, generally rod-like, article-retaining members for maintaining the articles in the bins in the vertical stacks. Dispensing means are provided selectively operable with the bins for dispensing a bottom-most article from a selected one of the bins.

Preferably, the article-retaining members are in the form of wires for guiding the articles and are positioned to straddle the sides and the ends of the articles. Also, preferably, the wires are adjustable radially to accommodate candy of various lengths and are adjustable circumferentially (width-wise with respect to the candy) to adjust for candy of various widths.

With this construction, a vending machine is provided which is well-suited for dispensing small snack-size candy. The candy is effectively guided within the elongate wires and the wires, being adjustable, can be adapted to candy of various sizes and shapes. Also, the wires do not obscure the packaging of the candy, as would solid walls, thereby making it easier for the user of the vending machine to make an appropriate selection. This construction also provides large capacity and resists jamming. Furthermore, the arrangement is quite compact and lightweight.

Accordingly, it is a primary object of the present invention to provide a drum-type vending machine which is durable in construction, economical in manufacture, and reliable in use.

It is another object of the present invention to provide a drum-type vending machine which is well-suited for vending snack-size candy.

It is another object of the present invention to provide a drum-type vending machine which is compact and lightweight.

It is another object of the present invention to provide a drum-type vending machine which is well-suited for dispensing candy of irregular sizes and shapes.

It is another object of the present invention to provide a drum-type vending machine which provides good visibility of the packaging of the candy.

It is yet a further object of the present invention to provide a drum-type vending machine which resists jamming and has a large capacity.

Other objects, advantages, and features of the present invention will become apparent upon reading the following specification in conjunction with the accompany drawing figures.

BRIEF DESCRIPTION OF THE DRAWING FIGURES

DETAILED DESCRIPTION

Figure 1:
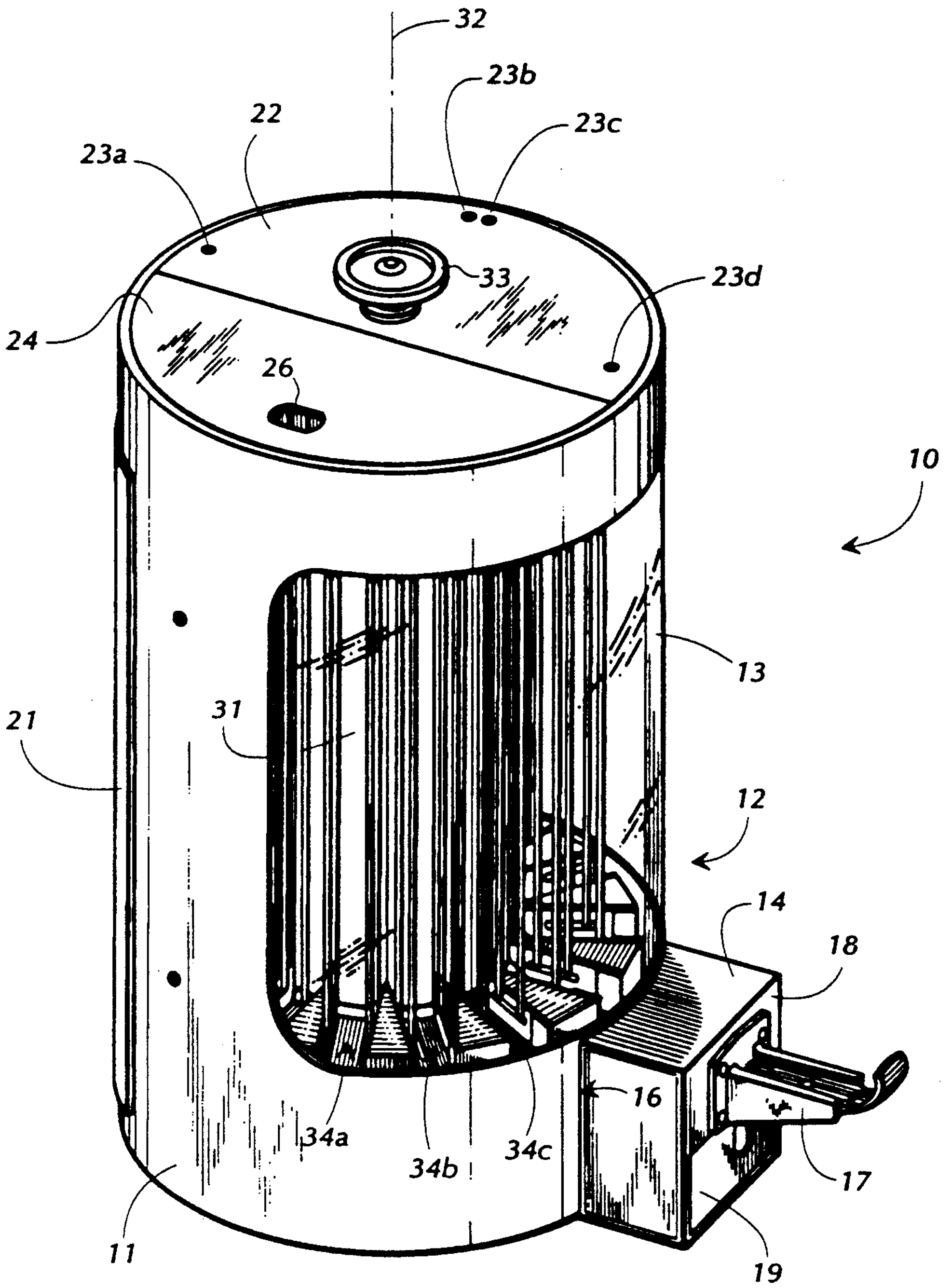
FIG. 1 is a perspective view of a drum-type vending machine according to a preferred form of the present invention.

Referring now in detail to the drawing figures, wherein like reference numerals represent like parts throughout the several views, FIG. 1 shows a drum-type vending machine 10 according to a preferred form of the invention. The vending machine 10 is particularly adapted for vending small snack-size candies. However, the vending machine also has application for other articles. The vending machine 10 includes a generally cylindrical housing 11 made of aluminum. A large cutout indicated generally at 12 is formed in the cylindrical housing 11 and extends through approximately 180°. The cutout 12 is covered by an internally mounted flexible, clear plastic shield or window 13 which is 1/16 inch thick and which is conformed to the curved shape of the housing 11. The window 13 provides clear viewing of the internal workings of the vending machine and of the candy contents of the vending machine.

A coin box indicated at 14 is mounted to a lower portion of the cylindrical housing below the window 13. The coin box has a generally rectangular box-shape, but having a contour to match the radius of the outer surface of the cylindrical housing and is welded thereto along the sides of the coin box along edges of the coin box, for example, along edge 16. A coin slide 17 is mounted to a forward face 18 of the coin box 14 for enabling operation of the vending machine upon receipt of an appropriate coin. The coin slide or coin mechanism 17 is a "Monarch style" heavy duty coin mechanism adapted to accept a United States quarter and has a 3¼ inch stroke. An access cover 19 is lockably mounted to a lower portion of the forward face 18 by an unshown lock to allow removal of collected coins by service personnel.

An access panel 21 is mounted to a rear portion of the cylindrical housing 11 generally opposite the coin box 14. A first upper panel 22 in the shape of a half circle is rigidly secured to a top portion of the cylindrical housing 11 by rivets 23*a*, 23*b*, 23*c*, and 23*d* or by other suitable fastening means. Alternatively, the upper access panel 22 could be permanently secured there by welding to the cylindrical housing, at the expense of access to the interior of the housing for servicing. A second upper panel 24 is removably secured to a top portion of the cylindrical housing 11 by an unshown lock operating through lock hole 26.

A rotary drum 31 is centrally mounted within the cylindrical housing 11 for rotation about its longitudinal axis 32. A knob or handle 33 is provided for rotating the drum 31, as will be described in more detail below. A series of trays or bins, such as bins 34*a*, 34*b*, 34*c*, etc.; are provided around the periphery of the rotary drum 31 in a carousel-type fashion. The bins are adapted for receiving snack-size candy or other articles therein in a vertical stack and for maintaining and guiding the articles within the stack. Upon rotation of the drum 31 by a handle 33 the bins are individually selectively operable with the coin slide 17 for dispensing a bottom-most article from the bins.

Figure 2:
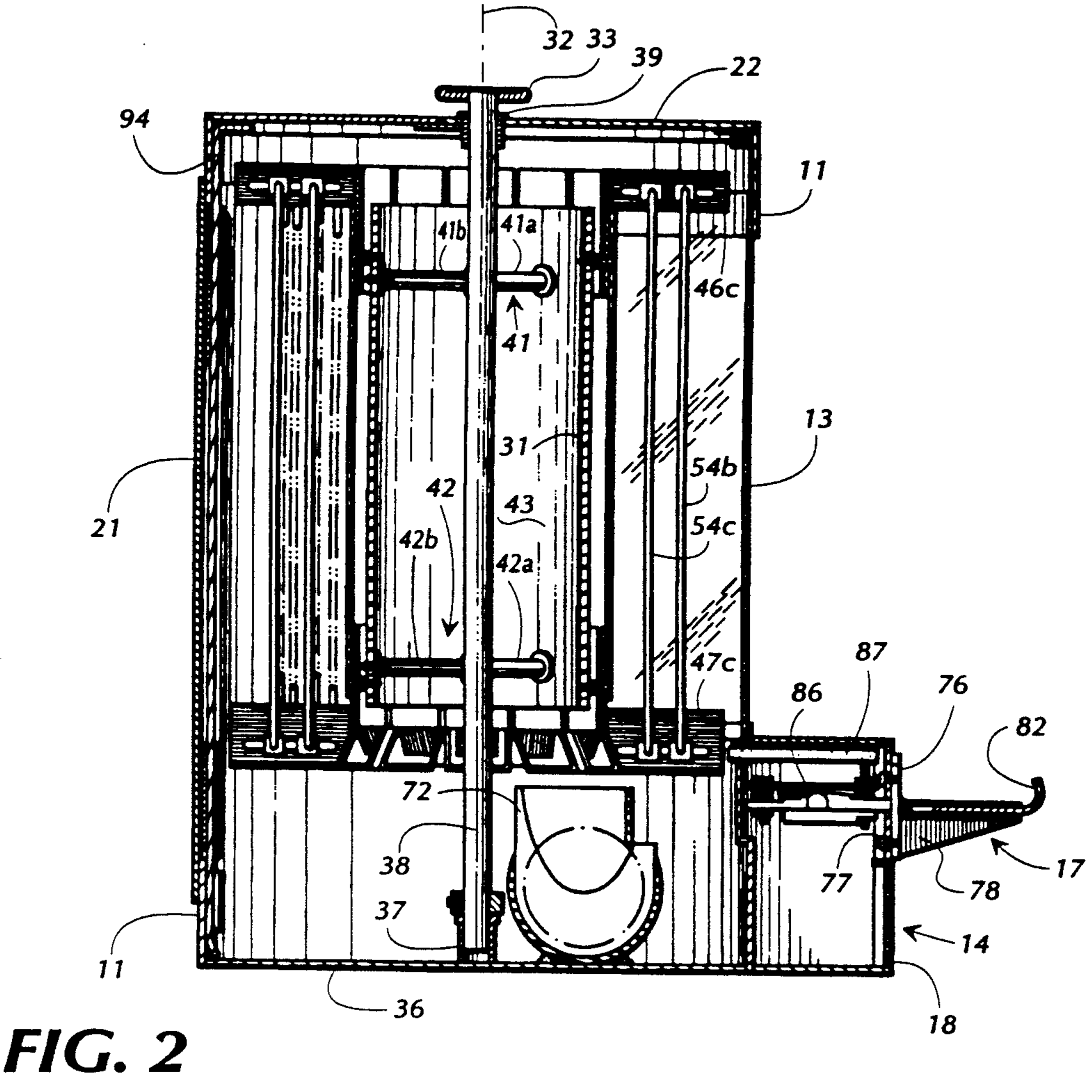
FIG. 2 is a side sectional view of the drum-type vending machine of FIG. 1.

As shown in FIG. 2, a lower panel 36 is secured to a bottom portion of the cylindrical housing 11 and generally forms a base for the vending machine 10. A bronze bushing 37 is centrally mounted to an upper surface of the bottom panel and is adapted for receiving an elongate main shaft 38 for rotation therein. The main shaft 38 extends through the rotary drum 31 and through the upper panel 22 and is rotatably guided through the upper panel 22 by a bronze bushing 39. The main shaft 38 is secured to and drives the rotary drum 31 via upper and lower sets of spokes 41 and 42. The upper spoke set 41 and the lower spoke set 42 each includes three tubular spokes rigidly secured to and extending between the main shaft 38 and an interior surface 43 of the rotary drum 31, though in FIG. 2, only two of the three spokes are shown for each set. For example, upper spoke set 41 includes spoke 41*a* and spoke 41*b* and a third, unshown spoke, while lower spoke set 42 includes spoke 42*a* and spoke 42*b* and a third, unshown spoke.

Figure 4:
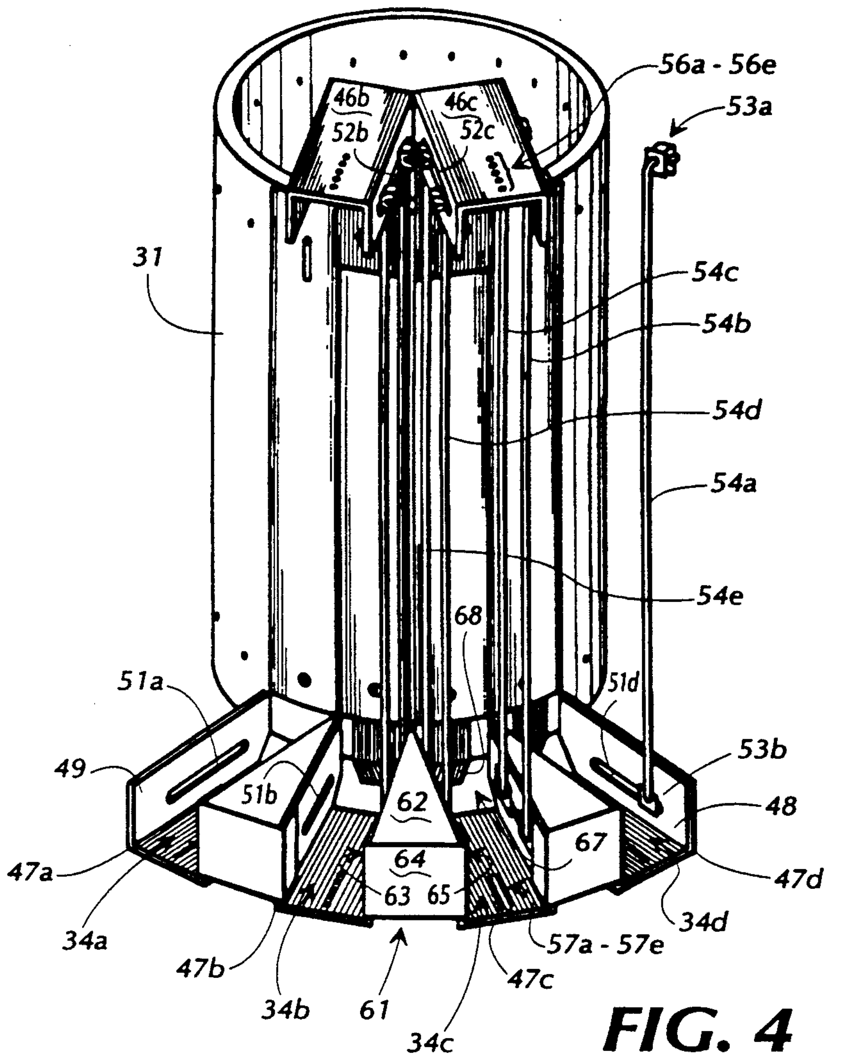
FIG. 4 is a schematic, perspective view of a portion of the drum-type vending machine of FIG. 1, with some elements removed for clarity of illustration.

As shown in FIGS. 2 and 4, a series of upper brackets, such as upper brackets 46*b* and 46*c* are positioned circumferentially around rotary drum 31 and each extends outwardly radially therefrom. Lower brackets, such as lower brackets 47*a*, 47*b*, 47*c*, and 47*d*, are positioned circumferentially about a lower portion of rotary drum 31 and each extends radially outwardly therefrom. Each of the upper and lower brackets 46 and 47 are generally U-shaped channel sections, with the upper brackets 46 having an open portion of the channel facing downwardly and the lower brackets 47 having an open portion of the channel facing upwardly. Thus, each upper and lower bracket includes two parallel sidewalls and a base (be it positioned at a bottom or top thereof) extending between the sidewalls. For example, lower bracket 47*d* has a right-hand sidewall 48 and an unshown corresponding left-hand sidewall, while lower bracket 47*a* has a left-hand sidewall 49 and a corresponding unshown right-hand sidewall. Each of the sidewalls of the upper brackets and of the lower brackets includes an elongated slot formed therein and extending radially, such as slots 51*a*, 51*b*, 51*d*, and 52*b* and 52*c*.

Figure 6:
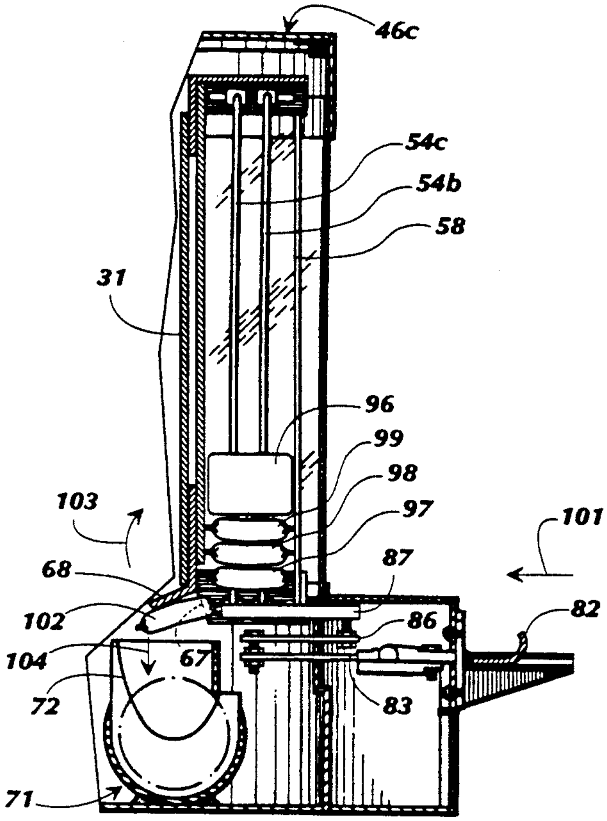
FIG. 6 is a schematic, sectional view of a portion of the drum-type vending machine of FIG. 1, showing a stack of candy maintained within a bin and showing a candy being dispensed from the vending machine.

Bushings or slides, such as bushings 53*a* and 53*b*, are slidably mounted within the slots and each includes a central opening formed therein. The central openings formed in the bushings are adapted for receiving lateral end portions of elongated wires or guide rods or article-retaining members, such as guide rods 54*a*, 54*a*, 54*b*, 54*c*, 54*d*, 54*e*, etc., as shown in FIG. 4. As can be seen in FIG. 4, each bin, such as bin 34*c*, is defined by a lower bracket (47*c*), an upper bracket (46*c*), and guide rods (54*b*–54*e*). This pattern of a bin comprising an upper bracket and a lower bracket and four guide rods is repeated at each station around the carousel. A series of holes are formed in an outer portion of each of the base portions of the upper and lower brackets. For example, upper bracket 46*c* has formed therein a series of holes 56*a*–56*e*, while lower bracket 47*c* has a series of holes 57*a*–57*e*. A fifth guide rod, such as fifth guide rod 58 shown in FIG. 6, is selectively and removably positioned in one of these guide holes.

A generally wedge-shaped cover, for example, wedge-shaped cover 61, covers the otherwise open space between adjacent bins. Each cover 61 has a triangular upper panel 62, a side panel 63, a back panel 64, and another side panel 65.

The bins, such as bin 34c, extend all the way from the lower bracket to the upper bracket. In a bottom portion of the bin, an article dispensing staging chamber generally is defined between the sidewalls of the lower bracket. An opening or exit portal 67 lies adjacent the article dispensing staging chamber, adjacent a bottom portion of the rotary drum 31 and an inner portion of the lower bracket. A resilient spring or biasing member 68 has a lower portion which is oriented at a 45° angle relative to the vertical direction or the longitudinal axis 32. Together, the biasing member 68 and the exit portal 67 cooperate to resist accidental movement of a candy from the stack out through the exit portal and also act to prevent more than one candy from being dispensed at a time. In this regard, the dimensions of the exit portal should be selected to prevent two candies from passing outwardly at the same time.

As shown FIGS. 2 and 3, a dispensing chute 71 is mounted to bottom panel 36 generally below the rotary drum 31 intermediate the main shaft 38 and the coin box 14. The dispensing chute 71 includes an open, upwardly facing mouth 72 for receiving candies dispensed from a selected one of the bins as shown in FIG. 6. The dispensing chute 71 terminates at an outer portion 73 adjacent an unshown hole formed in a lower portion of the cylindrical housing 11, thereby allowing the purchaser of a candy to reach into the outer portion 73 of the dispensing chute 71 to receive a dispensed candy. The dispensing chute 71 is a 4-inch diameter PVC (polyvinylchloride) tube and is generally J-shaped.

Figure 3:
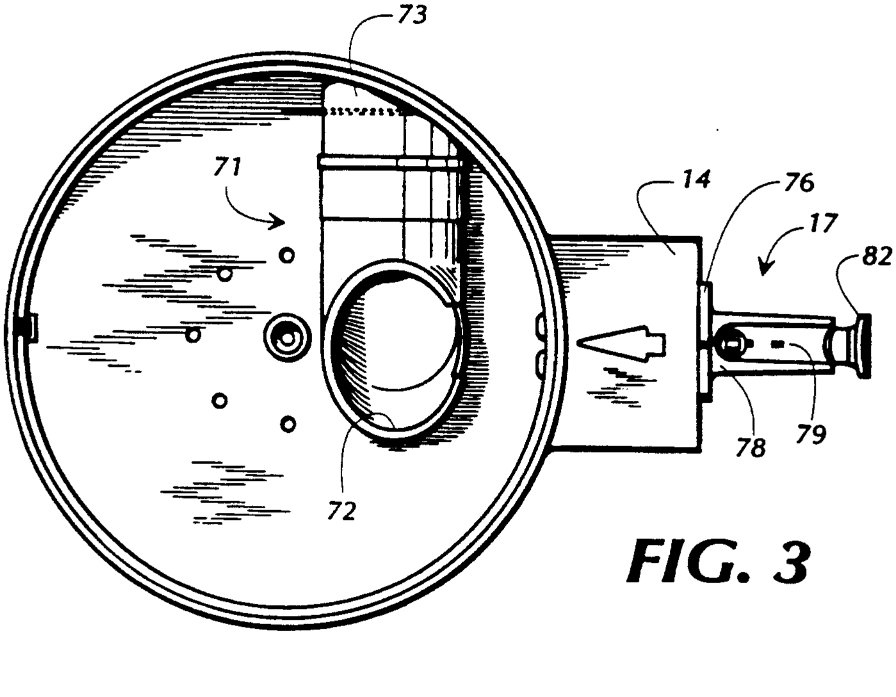
FIG. 3 is a top sectional view of the drum-type vending machine of FIG. 1.
Figure 5:
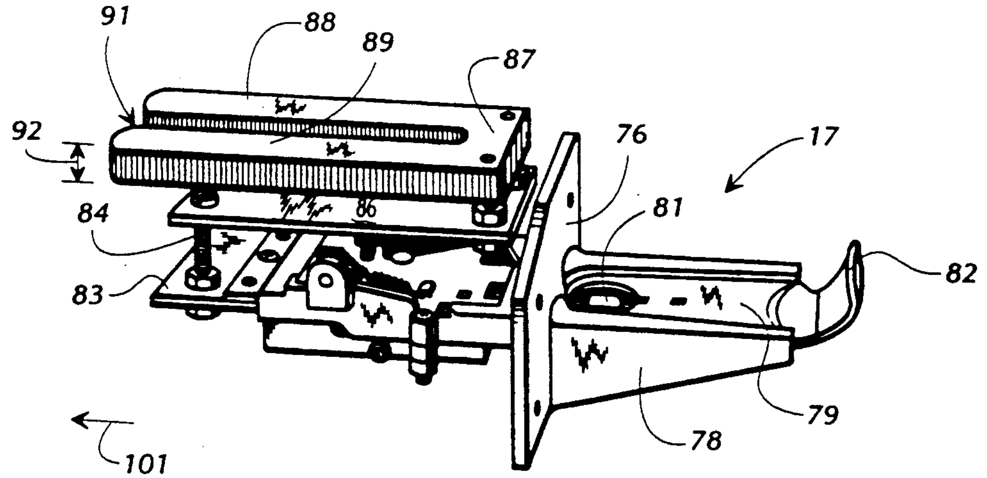
FIG. 5 is a perspective view of a coin-slide portion of the drum-type vending machine of FIG. 1.

As shown in FIGS. 2, 3 and 5, the coin slide 17 includes a mounting flange 76. The mounting flange 76 is positioned on an outside surface of the forward face 18 of the coin box 14 and is secured in place by threaded fasteners mounted from inside the coin box, such as threaded fastener 77. The coin slide 17 further includes an outwardly extending chute 78 slidingly receiving therein a coin sled 79. The coin sled 79 includes a coin slot 81 generally in the middle thereof and a push handle 82 at one end thereof. At an end 83 of the coin sled 79 generally opposite the push handle 82, a bolt 84 and a second unshown bolt extend upwardly and support thereon a thin lateral support platform 86. A candy ejection member 87 is mounted to, and is positioned parallel to and spaced above, the lateral support platform 86. The candy ejection member 87 comprises first and second elongated fingers 88 and 89 which define therebetween an elongated recess indicated generally at 91. The candy ejection member has a length generally corresponding to at least the length of the candy or other article to be dispensed from the vending machine and has a thickness 92 roughly comparable to the thickness of the typical candy item to be dispensed.

For loading the vending machine 10 with candy, upper access panel 24 is removed and then a locking member 94 is removed from within the cylindrical housing, allowing the rear access panel 21 to be taken off the housing to provide easy access to the bins. If a fifth guide rod 58 is in place in the guide holes 56a-56e and 57a-57e, the fifth guide rod should be removed to allow candy to be stacked in the bin. After candy has been stacked in the bin, a rectangular block 96 is placed on top of the stack of candies, such as candies 97, 98, and 99, as shown in FIG. 6. The block 96 adds some weight to the top Of the stack and tends to stabilize the stack within the bin. The fifth guide rod 58 can then be reinstalled in the holes (using unshown means for securing the guide rod in place). Handle 33 can then be turned to bring another bin around for loading. This process continues until all of the bins are reloaded. The rear cover is then reinstalled along with the securing member 94 and the upper access cover 24. The candy machine is then ready for use by the general public.

To vend a candy from the vending machine, the handle 33 is turned to select a candy. A coin, such as a U.S. quarter, is placed in the coin slot 81 and the coin sled is pushed in the forward direction 101 as shown in FIG. 6 by pushing on the push handle 82. This action moves the end portion 83 of the coin sled forward in direction 101 (See FIGS. 5 and 6) and thereby carries the candy ejection member in the forward direction. As the candy ejection member 87 moves in the forward direction 101, the fingers 88 and 89 move past the fifth guide rod 58 and the guide rod is received within the elongated slot 91. The distal end of the fingers 88 and 89 contacts a bottom-most candy, such as candy 102 and pushes it through the exit portal 67 (See FIG. 6 and FIG. 4) against the biasing force of the spring member 68. This causes the spring member to rotate slightly upwardly in the direction of direction arrow 103. This pushes downwardly on the candy 102 and causes the candy to fall in the direction of direction arrow 104, aided by gravity. Thus, the candy 102 drops into the dispensing chute 71 where it slides toward the outside of the vending machine, ready to be grasped by the operator. Note that the candy ejection member 87 supports the next candy 97 thereabove until the candy ejection member is withdrawn, and while so doing, holds the next candy parallel to the remaining candy in the stack.

Figure 7:
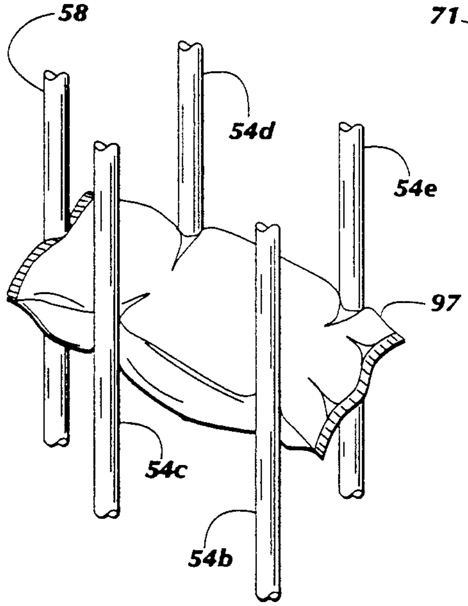
FIG. 7 is a schematic, perspective view of a candy guided within and conformed to a portion of the drum-type vending machine of FIG. 1.

An advantage of the present arrangement is that the wire or rod-like guide members tend to cause the candy and/or package to conform to the guide members, thereby effectively guiding the candy within the bin, while minimizing the likelihood of jamming. This is shown schematically in FIG. 7. This type of guiding also lends itself quite well to using different size candy and oddly shaped candy.

Figures 8A, 8B:
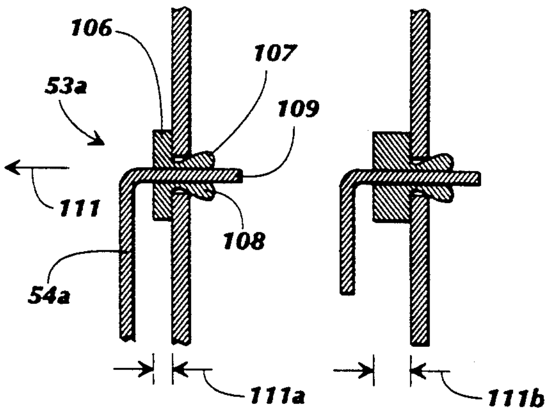
FIGS. 8A and 8B are sectional views of a portion of the drum-type vending machine of FIG. 1, showing two versions of a component part with two different dimensions to provide width-wise adjustment of a bin.

To accommodate longer candy pieces, the guide rods can be spread farther apart in the radial direction by sliding the bushings radially along the slots and the fifth guide rod 58 can be moved outwardly or removed altogether. Also, to accommodate candy of different widths, the guide rods can be moved together or apart to define a more narrow or wider bin for receiving candy. For example, as shown in FIG. 8A, a guide rod 54a is received within a bushing 53a. The bushing includes a flange portion 106 having thickness 111a and a transverse dimension greater than the width of the slots. The bushing also has two wing-like portions 107 and 108. The bushing also defines a central passage therein for receiving the lateral upper end 109 of the guide member 54a. There is a slight friction fit between the upper end 109 of the guide member and the central passage of the bushing. Thus, to adjust the width of the bin, one can merely pull the guide rod slightly out of the bushings in the direction of direction arrow 111 to narrow the bin. Of course, to widen the bin, one would push the guide rods in the opposite direction and farther into the bushings. Alternatively, it is possible to remove the guide rod altogether from within the bushing and to replace the bushing with a bushing having a thicker (or thinner) flange to achieve the desired width within the bin. This is shown schematically in FIG. 8B by bushing 106 having a relatively large flange thickness 111b.

With this construction, a vending machine is provided which is well-suited for dispensing small snack-size candy. The candy is effectively guided within the elongate wires and the wires, being adjustable, can be adapted to candy of various sizes and shapes. Also, the wires do not obscure the packaging of the candy, as would solid walls, thereby making it easier for the user of the vending machine to make an appropriate selection. This construction also provides large capacity and resists jamming. Furthermore, the arrangement is quite compact and lightweight.

While the invention has been disclosed in preferred forms only, it will be obvious to those skilled in the art that many modifications, additions, and deletions may be made therein without departing from the spirit and scope of the invention as set forth in the following claims.

I claim:

1. A drum-type vending machine for vending articles, such as small candy, said vending machine comprising:
- a housing;
- a rotary drum mounted within said housing for rotation about a longitudinal axis of said drum, said rotary drum including a plurality of vertical bins for holding a plurality of articles, said vertical bins each comprising a plurality of elongate, generally narrow, generally rod-like, article-retaining members for maintaining articles in said bins in vertical stacks;
- support members secured to said rotary drum and having slots formed therein extending radially, said wherein end portions of at least some of said article-retaining members a removably positioned in said slots;
- bushings slidably received in said slots and mounted to said end portions of said article-retaining members, wherein said bushings are removably mounted in said slots and wherein each has a flange having a transverse dimension greater than a width of said slots, said flanges having a selected thickness, whereby to adjust the width of a bin, the bushings can be removed from the slots and replaced with bushings having thicker or thinner flanges, as required; and
- dispensing means selectively operable with said bins for dispensing a bottom-most article from a selected one of said bins.

2. A vending machine as claimed in claim 1 wherein said plurality of article-retaining members of each of said bins comprises first, second, third, and fourth members adjustably positioned for straddling the articles for maintaining the articles in a preferred orientation in the vertical stack.

3. A vending machine as claimed in claim 2 wherein the positions of said article-retaining members are radially adjustable.

4. A vending machine as claimed in claim 2 wherein said vertical bins are adapted for holding generally elongate candy having sides and ends, said first, second, third, and fourth article-retaining members being positioned for straddling the sides of the candy, each of said bins further comprising a fifth generally rod-like article-retaining member movably positioned for engaging an end of the candy.

5. A vending machine as claimed in claim 4 wherein the position of said fifth article-retaining member is radially adjustable.

6. A vending machine as claimed in claim 1 wherein said article-retaining members are cylindrical.

7. A vending machine as claimed in claim 1 further comprising rectangular blocks loosely positioned within said bins for placement atop a stack of articles to stabilize the stack.

8. A drum-type vending machine for vending articles, such as small candy, said vending machine comprising:
- a housing;
- a rotary drum mounted within said housing for rotation about a longitudinal axis of said drum, said rotary drum including a plurality of vertical bins for holding a plurality of articles, said vertical bins each comprising a plurality of elongate, generally narrow, generally rod-like, article-retaining members for maintaining articles in said bins in vertical stacks, wherein said bins define an article dispensing staging chamber at the bottom of each thereof and having an exit portal, said rotary drum further comprising biasing means positioned adjacent said exit portal for resisting movement of an article form said article dispensing staging area through said exit portal; and
- dispensing means selectively operable with said bins for dispensing a bottom-most article from a selected one of said bins.

9. A vending machine as claimed in claim 8 wherein said exit portal is dimensioned to allow only one article at a time to pass therethrough.

10. A vending machine as claimed in claim 1 wherein said rotary drum comprises a cylindrical shell, an outer portion of which partially defines said vertical bins.

11. In a drum-type vending machine for vending articles, such as candy, of the type having a housing and a rotary drum mounted within the housing for rotation about a longitudinal axis, the improvement therein comprising:
- a plurality of vertical bins mounted tot he rotary drum and comprising elongated wire member means for maintaining articles in vertical stacks while providing substantially unobscured viewing of the articles, wherein said bins define an article dispensing staging area at the bottom of each thereof and having an exit portal, the improvement further comprising biasing means positioned adjacent said exit portal for resisting movement of an article from said article dispensing staging area through said exit portal.

12. The improvement of claim 11 wherein said wire member means comprises first, second, third, and fourth members radially adjustably positioned for straddling the articles for maintaining the articles in a preferred orientation in the vertical stack.

13. The improvement of claim 12 wherein said vertical bins are adapted for holding generally elongate candy having sides and ends, said first, second, third, and fourth members being positioned for straddling the sides of the candy, each of said bins further comprising a fifth member adjustably positioned for engaging an end of the candy.

14. The improvement of claim 13 wherein the position of said fifth member is radially adjustable.

15. The improvement of claim 11 further comprising support members secured to the rotary drum and having slots formed therein extending radially, and wherein end portions of said wire member means are movably positioned in said slots.

16. The improvement of claim 15 further comprising bushings slidably received in said slots and mounted to said end portions.

* * * * *